United States Patent
Suga et al.

(10) Patent No.: US 6,313,875 B1
(45) Date of Patent: *Nov. 6, 2001

(54) IMAGE PICKUP CONTROL APPARATUS AND METHOD WHEREIN OTHER CONTROL APPARATUSES ARE INHIBITED FROM CONTROLLING A CAMERA

(75) Inventors: Akira Suga, Tokyo; Tomotaka Muramoto, Yokohama; Katsumi Iijima, Hachioji; Hideaki Mitsutake, Yokohama; Masayoshi Sekine, Tokyo, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/601,801

(22) Filed: Feb. 15, 1996

Related U.S. Application Data

(62) Division of application No. 08/339,266, filed on Nov. 10, 1994, now abandoned.

(30) Foreign Application Priority Data

Nov. 11, 1993 (JP) .................................................. 5-282445

(51) Int. Cl.$^7$ ...................................................... H04N 5/232
(52) U.S. Cl. ............................ 348/213; 348/211; 348/15; 348/159
(58) Field of Search ...................................... 348/207, 211, 348/212, 213, 36, 38, 39, 143, 169, 15, 153, 159, 705, 706; H04N 5/225

(56) References Cited

U.S. PATENT DOCUMENTS

| | | | |
|---|---|---|---|
| 4,992,866 | * 2/1991 | Morgan | 348/159 |
| 5,264,929 | * 11/1993 | Yamaguchi | 348/159 |
| 5,396,287 | * 3/1995 | Cho | 348/211 |
| 5,589,878 | * 12/1996 | Cortjens et al. | 348/211 |
| 5,675,358 | * 10/1997 | Bullock et al. | 348/211 |

* cited by examiner

*Primary Examiner*—Tuan Ho
(74) *Attorney, Agent, or Firm*—Fitzpatrick, Cella, Harper & Scinto

(57) ABSTRACT

Image pickup control apparatus and method displays, on a screen, an image picked up a camera and transmitted through a communications system. A plurality of control devices may control the camera through the communications system. When one of the control devices is in control of the camera through the communications system, the other control devices are inhibited from controlling the camera.

27 Claims, 13 Drawing Sheets

FIG. 8A

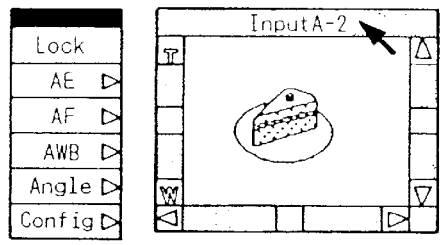

IF A TITLE BAR OF DISPLAY WINDOW OF CAMERA A-2 IS CLICKED BY POINTING DEVICE, CAMERA A-2 BECOMES OPERABLE. POSITION OF THUMB OF PANNING BAR IS DECIDED BY ATTRIBUTE AND CONDITION INFORMATION OF CAMERA A-1.

FIG. 8B

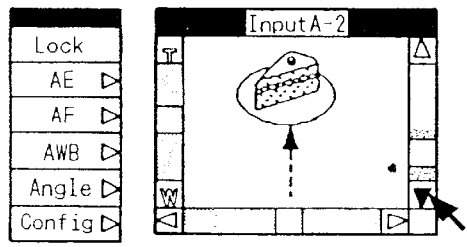

WHEN DOWNWARD PANNING BUTTON OF VERTICAL PANNING BAR IS KEPT CLICKED BY POINTING DEVICE OR THUMB IS DRAGGED DOWNWARD, TRIPOD OF CAMERA A-2 IS CONTROLLED AND CAMERA A-2 IS PANNED DOWNWARD.

FIG. 8C

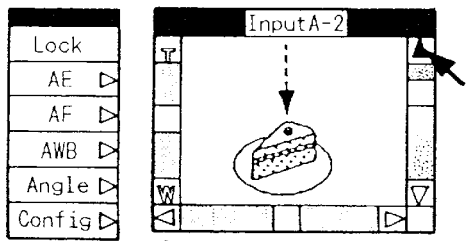

WHEN UPWARD SCROLL BUTTON OF VERTICAL PANNING BAR IS KEPT CLICKED BY POINTING DEVICE OR THUMB IS DRAGGED UPWARD, TRIPOD OF CAMERA A-2 IS CONTROLLED AND CAMERA A-2 IS PANNED UPWARD.

FIG. 8D

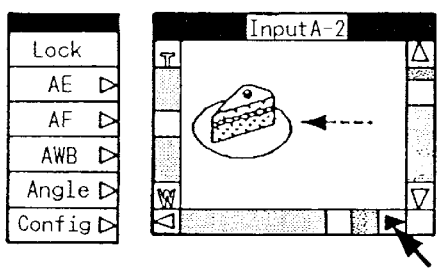

WHEN RIGHTWARD SCROLL BUTTON OF HORIZONTAL PANNING BAR IS KEPT CLICKED BY POINTING DEVICE OR THUMB IS DRAGGED RIGHTWARD, TRIPOD OF CAMERA A-2 IS CONTROLLED AND CAMERA A-2 IS PANNED RIGHTWARD.

FIG. 8E

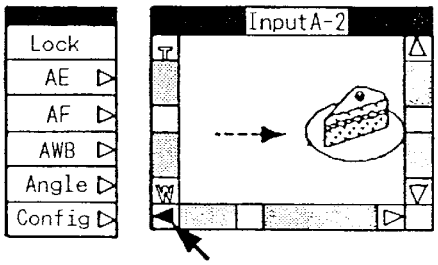

WHEN LEFTWARD SCROLL BUTTON OF HORIZONTAL PANNING BAR IS KEPT CLICKED BY POINTING DEVICE OR THUMB IS DRAGGED LEFTWARD, TRIPOD OF CAMERA A-2 IS CONTROLLED AND CAMERA A-2 IS PANNED LEFTWARD.

FIG. 9A
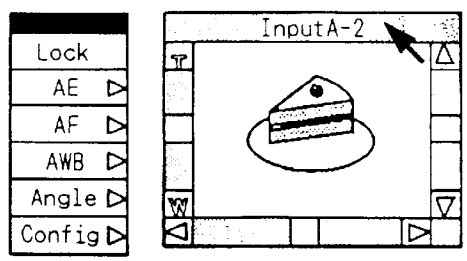
IF TITLE BAR IS CLICKED, CAMERA A-2 BECOMES OPERABLE.

FIG. 9B
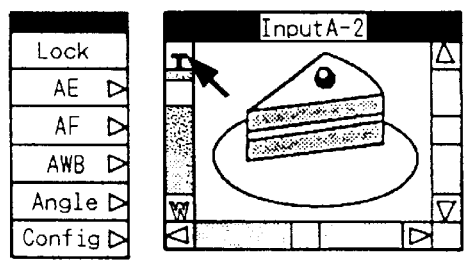
IF TELE BUTTON OF ZOOM BAR IS KEPT CLICKED OR THUMB IS DRAGGED IN DIRECTION OF TELE BUTTON, CAMERA A-2 IS ZOOMED IN.

FIG. 9C
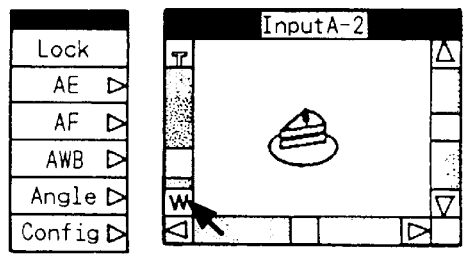
IF WIDE BUTTON OF ZOOM BAR IS KEPT CLICKED OR THUMB IS DRAGGED IN DIRECTION OF WIDE BUTTON, CAMERA A-2 IS ZOOMED OUT.

FIG. 9D
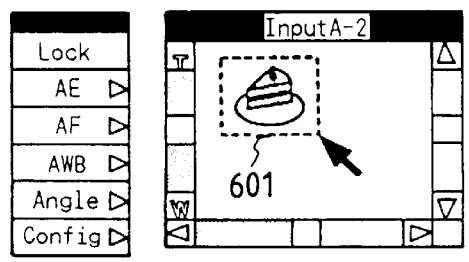
DRAG POINTING DEVICE TO DESIGNATE DESIRED FIELD ANGLE.

FIG. 9E
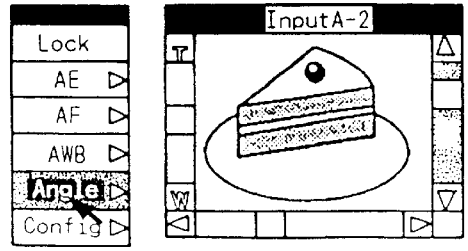
WHEN ANGLE MENU IS CLICKED, PANNING OF TRIPOD AND ZOOM OF CAMERA ARE CONTROLLED TO PROVIDE DESIGNATED FIELD ANGLE.

FIG. 10A 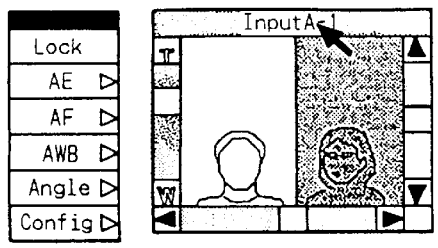
LEFT HALF OF SCREEN IS LIGHT AND RIGHT HALF IS DARK, SO THAT BOTH HALVES DO NOT PROVIDE SUITABLE EXPOSURE IN AVERAGE PHOTOMETRY.

FIG. 10B 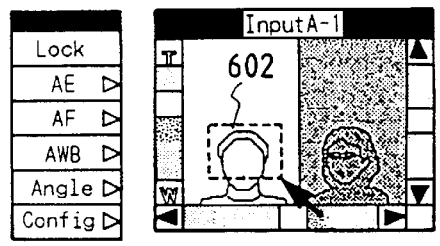
DESIGNATE RANGE OF IMAGE, IN WHICH SUITABLE EXPOSURE IS PROVIDED, BY POINTING DEVICE.

FIG. 10C 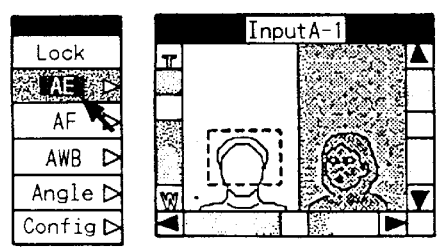
IF AE MENU IS CLICKED, MESSAGE INSTRUCTING TO CONTROL DESIGNATED RANGE WITH SUITABLE EXPOSURE IS SENT TO CAMERA A-1 WITH DESIGNATION INFORMATION FOR THAT RANGE.

FIG. 10D 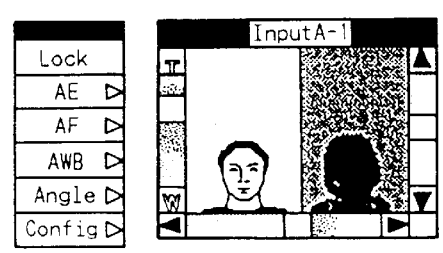
EXPOSURE LEVEL OF CAMERA A-1 IS CONTROLLED WITH IMAGE DATA IN RANGE IN WHICH SUITABLE EXPOSURE SHOULD BE PROVIDED.

FIG. 11A 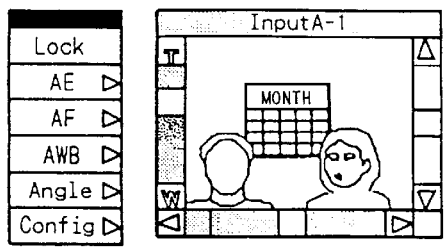 OBJECT POSITIONED AT CENTER OF SCREEN IS FOCUSED AND THUS PERSONS ARE NOT FOCUSED. CAMERA A-1 BECOMES CONTROLLABLE BY CLICKING TITLE BAR OF DISPLAY WINDOW OF CAMERA A-1 BY POINTING DEVICE.

FIG. 11B 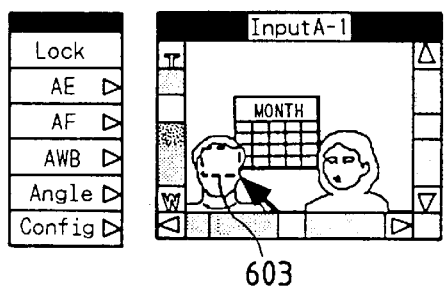 DESIGNATE RANGE OF IMAGE, TO BE FOCUSED, BY POINTING DEVICE.

FIG. 11C 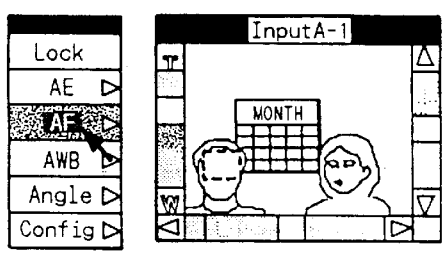 IF AF MENU IS CLICKED, MESSAGE INSTRUCTING TO FOCUS ON DESIGNATED RANGE IS SENT WITH FOCUSING RANGE DESIGNATION INFORMATION.

FIG. 11D 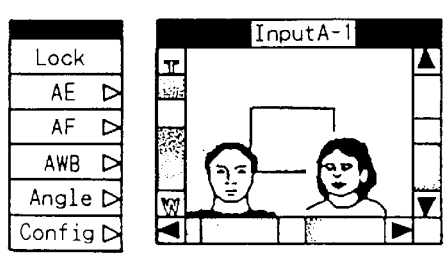 CAMERA A IS CONTROLLED ACCORDING TO FOCUSING RANGE DESIGNATION INFORMATION TO FOCUS ON DESIGNATED PERSON.

FIG. 12A

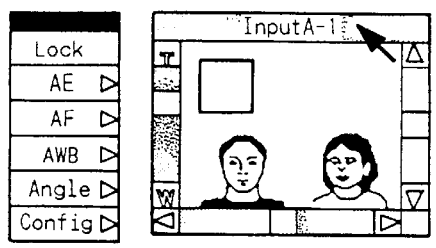

WHITE BALANCE CAN NOT BE ATTAINED WITH AVERAGE COLOR INFORMATION OF IMAGE SINCE COLOR OF WALL IS EXTREMELY DEEP. CAMERA A-1 BECOMES CONTROLLABLE BY CLICKING TITLE BAR OF DISPLAY WINDOW OF CAMERA A-1 BY POINTING DEVICE.

FIG. 12B

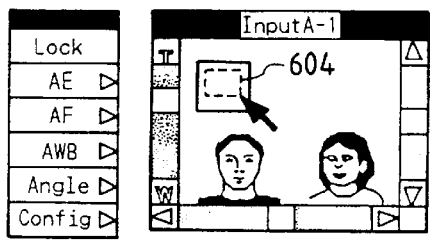

DESIGNATE RANGE OF IMAGE WHOSE COLOR IS TO BE WHITE, BY POINTING DEVICE.

FIG. 12C

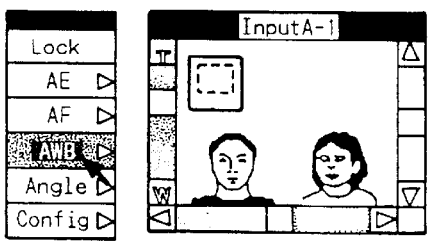

IF AWB MENU IS CLICKED, MESSAGE INSTRUCTING TO PERFORM WHITE BALANCE WITH IMAGE INFORMATION OF DESIGNATED RANGE IS SENT TO CAMERA A-1 WITH WHITE OBJECT RANGE DESIGNATION INFORMATION.

FIG. 12D

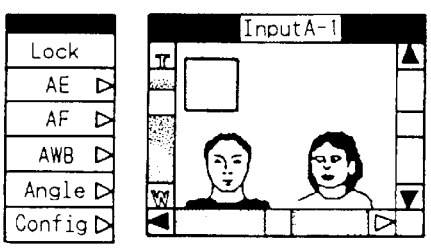

WHITE BALANCE OF CAMERA A-1 IS ATTAINED WITH IMAGE INFORMATION OF DESIGNATED RANGE.

FIG. 13A

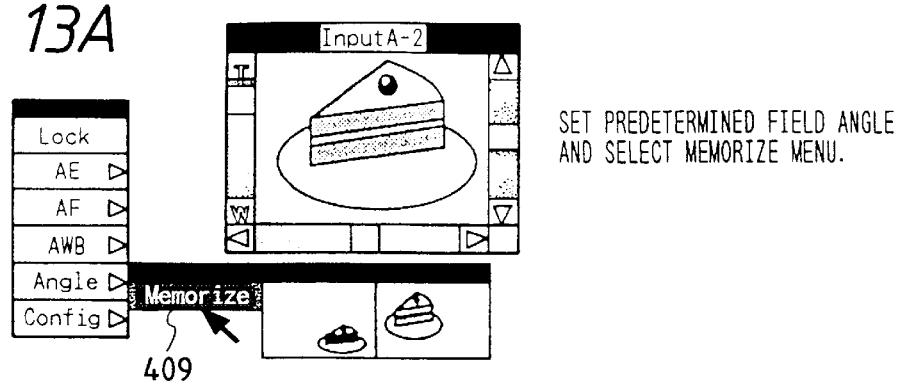

SET PREDETERMINED FIELD ANGLE AND SELECT MEMORIZE MENU.

FIG. 13B

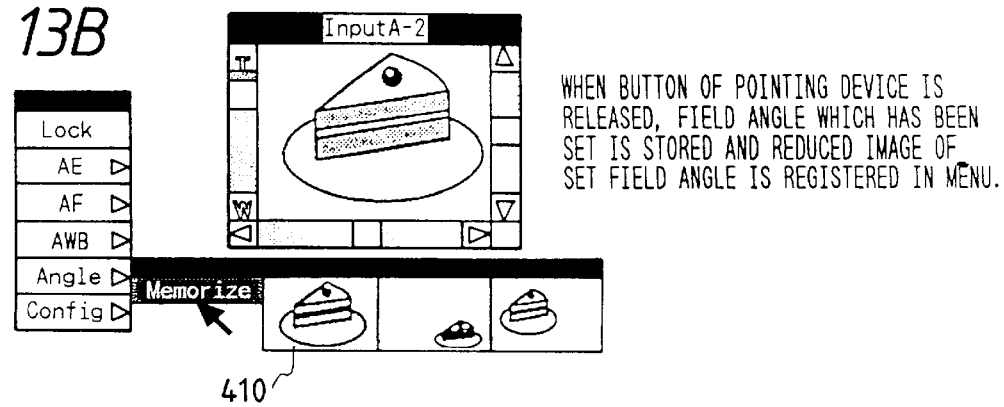

WHEN BUTTON OF POINTING DEVICE IS RELEASED, FIELD ANGLE WHICH HAS BEEN SET IS STORED AND REDUCED IMAGE OF SET FIELD ANGLE IS REGISTERED IN MENU.

FIG. 13C

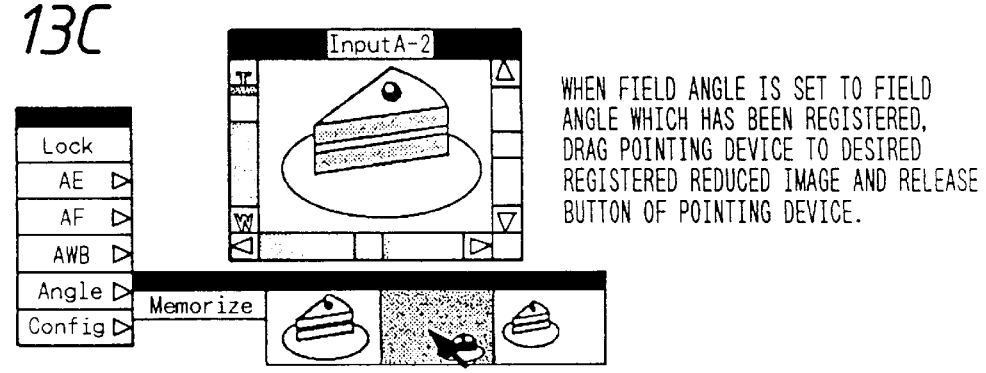

WHEN FIELD ANGLE IS SET TO FIELD ANGLE WHICH HAS BEEN REGISTERED, DRAG POINTING DEVICE TO DESIRED REGISTERED REDUCED IMAGE AND RELEASE BUTTON OF POINTING DEVICE.

FIG. 13D

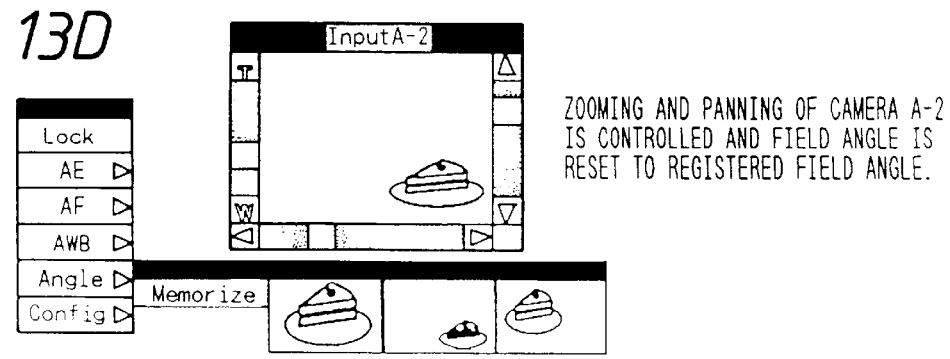

ZOOMING AND PANNING OF CAMERA A-2 IS CONTROLLED AND FIELD ANGLE IS RESET TO REGISTERED FIELD ANGLE.

FIG. 14

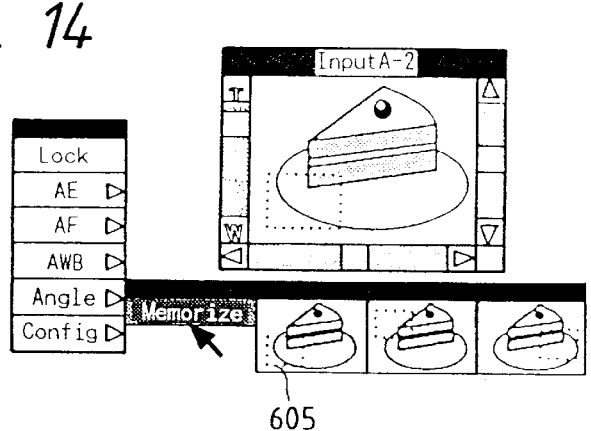

FIG. 15A

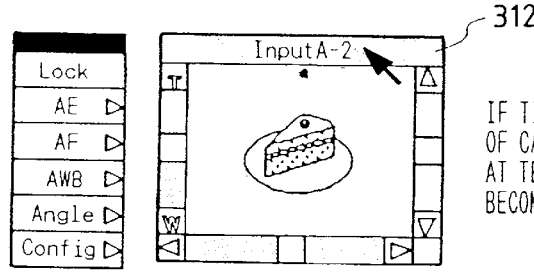

IF TITLE BAR OF DISPLAY WINDOW OF CAMERA A-2 BY POINTING DEVICE AT TERMINAL STATION B, CAMERA A-2 BECOMES CONTROLLABLE BY STATION B.

FIG. 15B

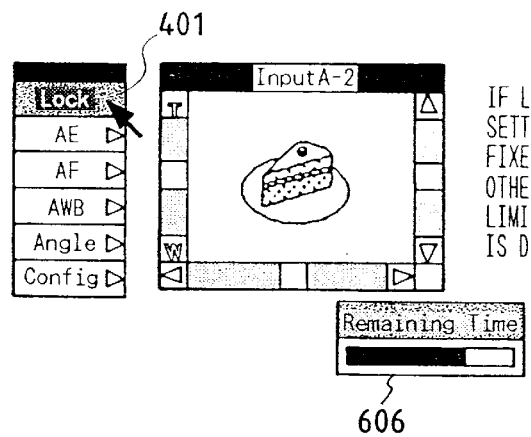

IF LOCK MENU IS CLICKED, CURRENT SETTING CONDITION OF CAMERA IS FIXED (INHIBITED TO BE CHANGED BY OTHER TERMINAL). LOCK STATUS IS LIMITED IN TIME AND REST OF TIME IS DISPLAYED.

FIG. 15C

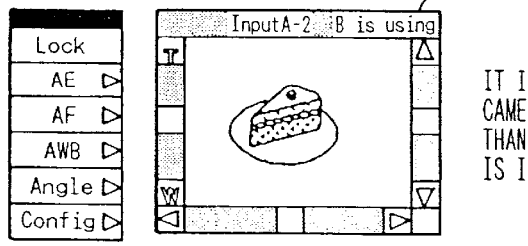

IT IS DISPLAYED IN WINDOW OF CAMERA A-2 AT TERMINALS OTHER THAN TERMINAL B THAT TERMINAL B IS IN USE.

IMAGE PICKUP CONTROL APPARATUS AND METHOD WHEREIN OTHER CONTROL APPARATUSES ARE INHIBITED FROM CONTROLLING A CAMERA

This application is a division of application Ser. No. 08/339,266 filed Nov. 10, 1994, now abandoned.

BACKGROUND OF THE INVENTION

1. Field of the Invention

The invention relates to a video system suitable for use in a teleconference or the like using an image through a multimedia network.

2. Related Background Art

In recent years, a television conferencing system has been widespread due to a spread of high speed digital lines. As a typical construction of the conventional television conferencing system, there is a representative system such that exclusive-use terminals each comprising a video camera for displaying the face of a speaker and a video monitor are installed at two or more locations and the terminals are connected by lines of N-ISDN or the like.

However, even if an exclusive-use video monitor is not used, moving images can be displayed on multiwindows owing to the recent realization of a high performance of a personal computer or a workstation. Therefore, a teleconference using moving images and voice sounds (hereinafter, the conference of such a style is referred to as a multimedia teleconference) is being put into practical use by using personal computers and workstations which are connected by a network. A calligraphic and pictorial camera to photograph not only the face of a partner of the conference but also a document or solid object is also used.

Moving images and voice sounds are used in the teleconference because of the introduction of the multimedia teleconferencing system, so that a communication of a higher quality is realized. However, in order to see a portion or the like which is not displayed on a display apparatus on the operator side, a message indicating that the operator wants to see such a hidden portion is informed to the partner side each time so as to operate the camera on the partner side. There is consequently a problem such that both operations are troublesome and the conference is interrupted or the like.

SUMMARY OF THE INVENTION

It is an object of the present invention to provide a video system with a high use efficiency and a high performance.

Another object of the invention is to provide an image pickup control apparatus which can photograph a video image with a high picture quality.

Still another object of the invention is to provide a camera corresponding to a video system of a high performance.

To accomplish the above objects, according to an embodiment of the present invention, control means for controlling a camera is connected to the camera by communicating means, an image pickup state of the camera is set on a screen of display means for displaying a video signal which is generated from the camera, and the camera is controlled so as to photograph an object in the set image pickup state. By using the above construction, there is an effect such that the image pickup state of the camera existing at a remote position can be easily controlled.

According to another embodiment of the invention, control means for controlling a camera is connected to the camera by communicating means, an image pickup state of the camera is set on a screen of display means for displaying a video signal which is generated from the camera, and the set image pickup state is stored. By using the above construction, there is an effect such that the image pickup state of the camera existing at a remote position can be quickly changed as necessary.

According to another embodiment of the invention, control means for controlling a camera is connected to the camera by communicating means, a range on a screen of display means for displaying a video signal which is generated from the camera is designated, and an image pickup state of the camera is changed for the designated range. By using the above construction, there is an effect such that the image pickup state of the camera existing at a remote position can be changed for a necessary range on the screen and a video image of a higher picture quality can be obtained.

According to another embodiment of the invention, when image pickup means of a camera converts an optical image into a video signal, its image pickup state is changed in accordance with an input from an external apparatus. By using the above construction, there is an effect such that the image pickup state of the camera can be controlled from a remote position.

According to further another embodiment of the invention, an apparatus has an image pickup element for converting a light to an electric signal, an image signal photographed by image pickup means which is controlled by an external input is displayed by image display means having a multiwindow display function through communicating means, a display screen of the display means is instructed and inputted by a pointing device, and a panning control of a desired image pickup apparatus is executed through communicating means. By using the above construction, there is an effect such that the panning control of the image pickup means existing at a remote position can be easily and certainly executed.

According to a further embodiment of the invention, an apparatus has an image pickup element for converting light to an image signal, an image signal obtained by photographing an object by image pickup means whose operation is controlled by an external input is displayed on image display means having a multiwindow display function through communicating means, a display surface of the display means is designated by a pointing device, and a focal distance and a direction of desired image pickup means are controlled through communicating means so that a field angle of the designated region coincides with a display image. By using the above construction, there is an effect such that the focal distance and direction of the image pickup means existing at a remote position can be easily and certainly controlled.

According to yet another embodiment of the invention, an apparatus has an image pickup element for converting light to an image signal, an image signal obtained by photographing an object by image pickup means whose operation is controlled by an external input is displayed by image display means having a multiwindow display function through communicating means, a display surface of the display means is designated by a pointing device, and an exposure amount of desired image pickup means is controlled through the communicating means so that a display image of the designated region has an optimum exposure amount. By using the above construction, there is an effect such that the exposure amount of the image pickup means existing at a remote position can be easily and certainly controlled.

According to yet another embodiment of the invention, an apparatus has an image pickup element for converting a light to an electric signal, an image signal obtained by photographing an object by image pickup means whose white balance is controlled by an external input is displayed by image display means having a multiwindow display function through communicating means, and a white balance of desired image pickup means is controlled through the communicating means so that the image is displayed in white. By using the above construction, there is an effect such that the white balance of the image pickup means existing at a remote position can be easily and certainly controlled.

According to a still further embodiment of the invention, an apparatus has an image pickup element for converting a light to an electric signal, an image signal obtained by photographing an object by image pickup means whose focus is automatically controlled by an external input is displayed through communicating means by image display means having a multiwindow display function, a display screen of the display means is designated by a pointing device, and a desired automatic focusing control is executed for the designated region through the communicating means. By using the above construction, there is an effect such that the automatic focusing control of the image pickup means existing at a remote position can be easily and certainly executed.

The above and other objects and features of the present invention will become apparent from the following detailed description and the appended claims with reference to the accompanying drawings.

BRIEF DESCRIPTION OF THE DRAWINGS

FIGS. 8A to 8E are diagrams for explaining a user interface of a panning control in the embodiment;

FIGS. 9A to 9E are explanatory diagrams about a zooming control in the embodiment;

FIGS. 10A to 10D are diagrams showing the user interface when an exposure level of an image of an arbitrary designated range is set to a proper value;

FIGS. 11A to 11D are diagrams showing the user interface when a focus is positioned to an object of an arbitrary designated range in the embodiment;

FIGS. 12A to 12D are diagrams showing the user interface when a white balance is attained on the basis of image information of an arbitrary designated range in the embodiment;

FIGS. 13A to 13D are diagrams showing a memory function of a field angle setting and the user interface in the embodiment;

FIG. 14 is a diagram showing a display example when a memory function of the setting and a reduction image is applied to a hierarchy menu of an AE menu;

FIGS. 15A to 15C are diagrams for explaining the user interface when the setting of a camera A-2 is fixed for a predetermined time.

DETAILED DESCRIPTION OF THE PREFERRED EMBODIMENTS

Figure 1:
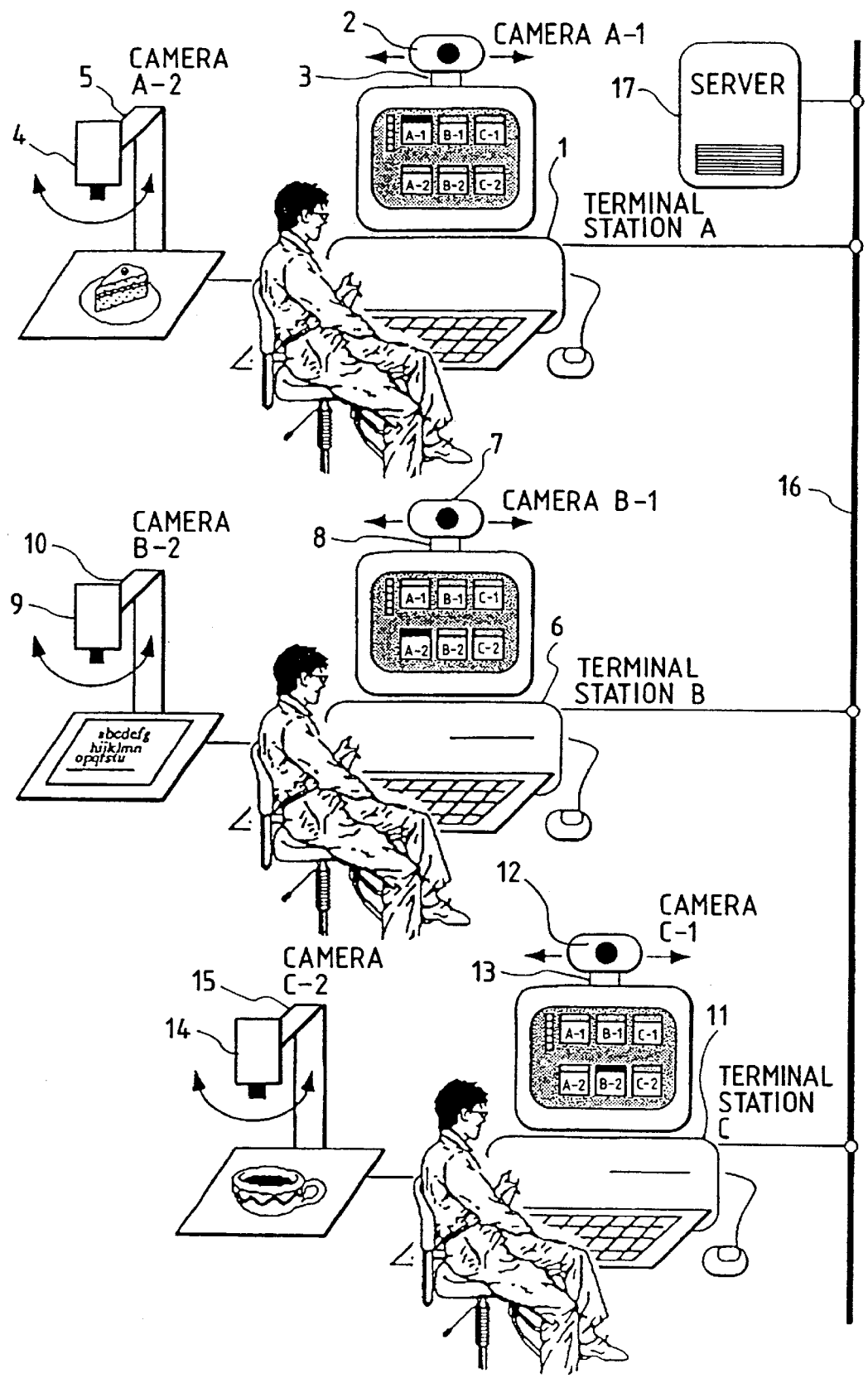
FIG. 1 is a block diagram showing a whole construction of an embodiment of the present invention.

FIG. 1 is a schematic diagram showing an example of a whole construction of the invention.

In FIG. 1, reference numeral 1 denotes a first terminal station which is used in a multimedia teleconference and it is simply called a terminal A. Actually, it is not always necessary to use the terminal only for the multimedia teleconference but a personal computer or a workstation which has a bit map display and can display in multiwindows is used as a terminal. Reference numeral 2 denotes a camera for mainly photographing the face of a person and such a camera is hereinafter referred to as a camera A-1. Reference numeral 3 denotes a tripod to control the direction of the camera A-1; 4 indicates a calligraphic and pictorial camera for photographing an original, a printed matter, a solid object, or the like and such a camera is hereinafter referred to as a camera A-2; 5 indicates a movable arm for changing a photographing region of the camera A-2.

In a manner similar to the above, reference numeral 6 denotes a second terminal station B; 7 a camera B-1 connected to the terminal B; 8 a tripod of the camera B-1; 9 a calligraphic and pictorial camera which is connected to the terminal B and such a camera is hereinafter referred to as a camera B-2; 10 a movable arm of the camera B-2; 11 a third terminal station C; 12 a camera which is connected to the terminal C and such a camera is hereinafter referred to as a camera C-1; 13 a tripod of the camera C-1; 14 a calligraphic and pictorial camera which is connected to the terminal C and such a camera is hereinafter referred to as a camera C-2; and 15 a movable arm of the camera C-2.

The image pickup region of each camera is controlled from each terminal by the tripods 3, 8, and 13 and the movable arms 5, 10, and 15. Reference numeral 16 denotes a network to connect the terminal stations and 17 indicates a server to manage the multimedia teleconferencing system. As for an image of each camera, one window is allocated to one camera and those images are displayed in multiwindows of the display of each terminal.

Figure 2:
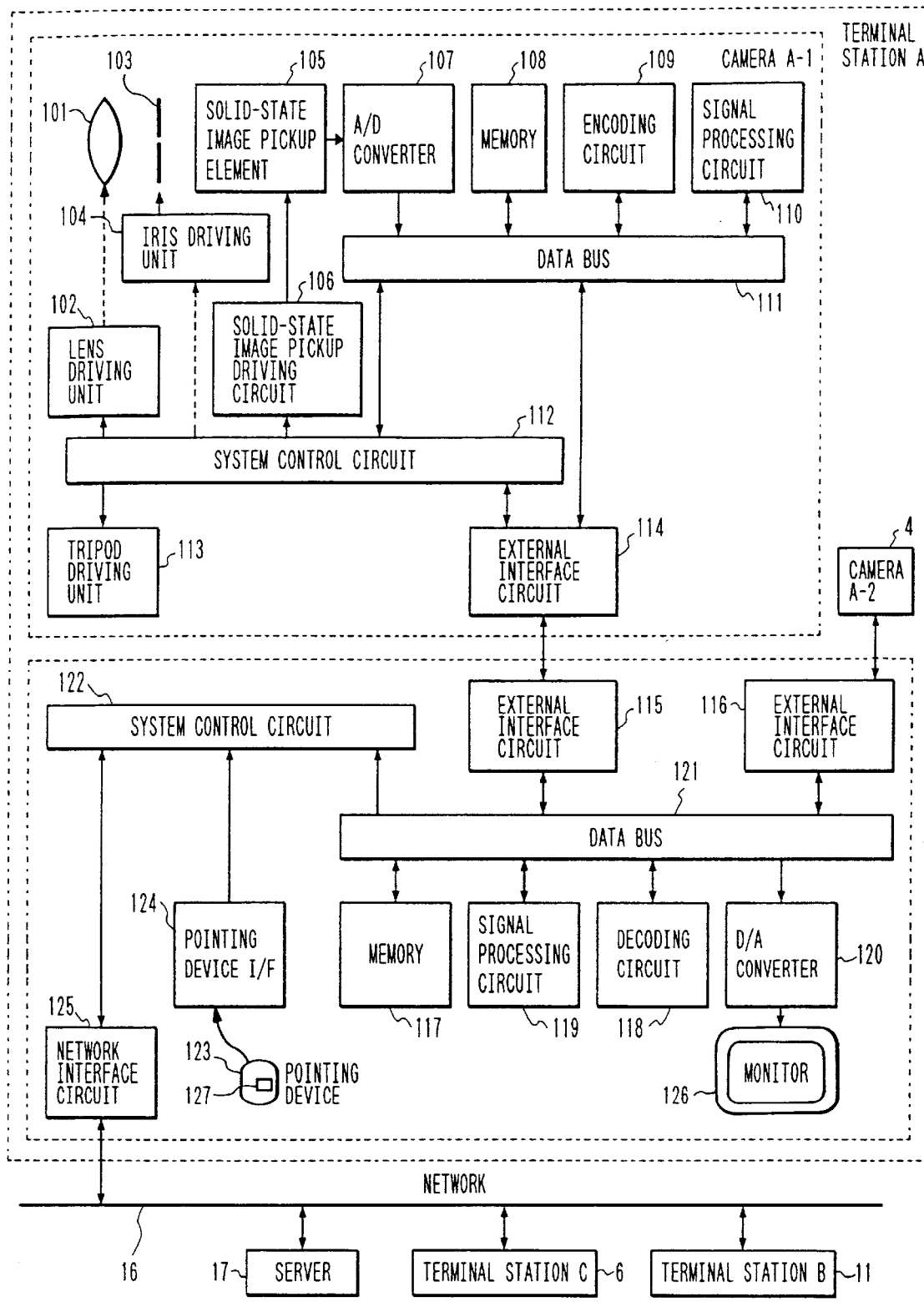
FIG. 2 is a block diagram showing a constructional example of a terminal station A and a camera A-1.

FIG. 2 is a block diagram showing a constructional example of the terminal A and the camera A-1. It is assumed that the other cameras also have a similar construction unless otherwise specified in the following description and the component elements having the same functions are designated by the same reference numerals.

In FIG. 2, reference numeral 101 denotes a lens; 102 a lens driving unit for performing a focusing adjustment of the lens and a zooming; 103 an iris; 104 an iris driving unit; 105 a solid-state image pickup element for converting an optical image projected by the lens 101 to an electric signal; 106 a solid-state image pickup element driving circuit for driving the solid-state image pickup element 105; 107 an A/D converter for A/D converting an output of the solid-state image pickup element 105; 108 a memory for temporarily storing the A/D converted image data; 109 an encoding circuit for compressing and encoding the image data which was temporarily stored in the memory 108; 110 a signal processing circuit for performing signal processes such as color separation, white balance correction, color conversion, frequency band limitation, outline correction, and the like of the image data stored temporarily in the memory 108; 111 a data bus to access the digital data in the memory 108 by the compressing circuit 109 and signal processing circuit 110; 112 a system control circuit for controlling the operation of the camera system; and 113 a tripod driving unit for driving the tripod 3 of the camera A-1. It is now assumed that in case of the calligraphic and pictorial camera like a camera A-2, the tripod driving unit 113 drives the movable arm 5. Reference numeral 114 denotes an external interface circuit for transmitting digital image data from the camera A-1 to the terminal A and for transmitting control parameters from the terminal A to the camera A-1. The camera A-1 is constructed by the above component elements.

Reference numeral 115 denotes a first external interface circuit of the terminal A. The I/F circuit 115 is connected to the camera A-1. Reference numeral 116 denotes a second external interface circuit of the terminal A. The I/F circuit 116 is connected to the camera A-2. Reference numeral 117 denotes a memory to temporarily store digital image data from a network; 118 a decoding circuit for expanding and decoding the image data sent from the network and camera as data compressed and encoded data; 119 a signal processing circuit for performing processes such as color conversion and gradation correction to the image data which has been decoded and stored temporarily in the memory 117; and 120 a D/A converter for D/A converting the signal which was processed by the signal processing circuit 119.

Reference numeral 121 denotes a data bus to access the digital data in the memory 117; 122 a system control circuit to control the operation of the terminal A; 123 a pointing device such as a mouse or the like; 127 a button of the pointing device 123; 124 a pointing device interface as an interface between the pointing device 123 and the system control circuit 122; 125 a network interface circuit for connecting the network and the terminal A; and 126 a monitor to display an image or data. The terminal A is constructed by the above component elements.

Figure 3:
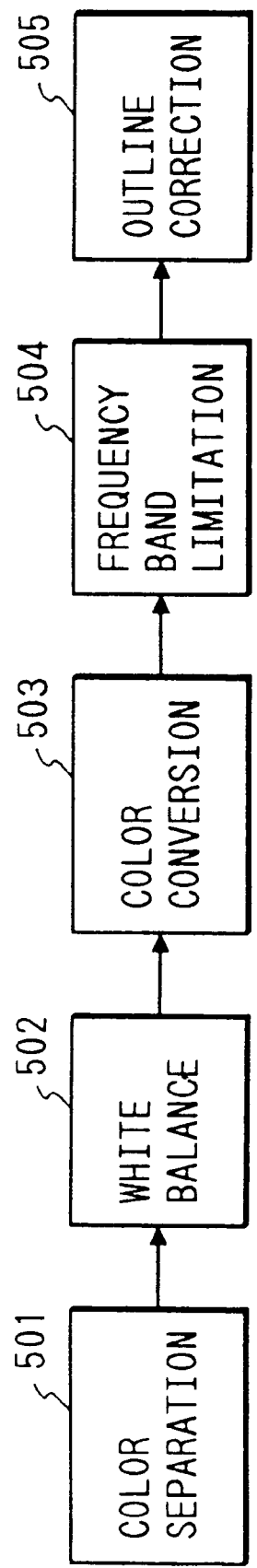
FIG. 3 is a block diagram showing a processing flow of a signal processing circuit 110.

FIG. 3 is a block diagram showing a processing flow of the signal processing circuit 110.

In FIG. 3, reference numeral 501 denotes a block of a color separation to extract signals corresponding to R, G, and B from an output of the solid-state image pickup element 105; 502 a block of a white balance to adjust a gain balance among the signal levels so that ratios of R, G, and B of a white portion of an object are set to 1:1:1; 503 a block of a color conversion to convert the RGB signals to a luminance and color difference signals of a good compressing efficiency; 504 a block of a frequency band limitation to limit unnecessary frequency bands; and 505 a block of an outline correction to improve a resolution feeling.

Figure 4:
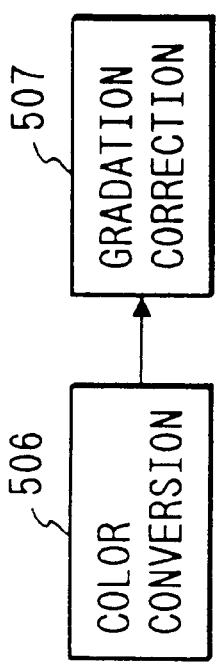
FIG. 4 is a block diagram showing a processing flow of a signal processing circuit 119.

FIG. 4 is a block diagram showing a processing flow of the signal processing circuit 119. Reference numeral 506 denotes a block of a color conversion to convert the luminance and color difference signals to the RGB signals; and 507 a gradation correction block to match with gradation characteristics of the monitor 126.

The operation of the terminal A will now be described.

In FIG. 2, image data from another terminal which is transmitted from the network 16 and a control command and parameters of the camera are supplied to the system control circuit 122 through the network interface circuit 125.

The image data from the network 16 and the image data from the camera A-1 or A-2 are stored into the memory 117 through the data bus 121. If the control command and parameters of the camera relate to the control of the camera A-1, they are supplied to the camera A-1 through the external interface circuit 115. If they relate to the control of the camera A-2, they are sent to the camera A-2 via the external interface circuit 116. The image data stored in the memory 117 is expanded and decoded by the decoding circuit 118 and is processed by the signal processing circuit 119. After that, the signal is D/A converted and the resultant analog signal is displayed on the monitor 126.

The operation of the camera A-1 will now be described.

The object is projected to the solid-state image pickup element 105 by the lens 101. In this instance, the focusing adjustment and the field angle adjustment are controlled by the system control circuit 112 through the lens driving unit 102. A light amount is controlled by the system control circuit 112 via the iris driving unit 104. The direction of the camera A-1 is controlled by the system control circuit 112 through the tripod driving unit 113. An output of the solid-state image pickup element 105 is converted to digital data by the A/D converter 107 and is once stored into the memory 108. The output data of the solid-state image pickup element 105 stored in the memory 108 is subjected to processes such as color separation, white balance, color conversion, frequency band limitation, and outline correction by the signal processing circuit 110. The processed image data is compressed and encoded by the encoding circuit 109 and is transmitted to the terminal A through the external interface circuit 114.

The image data sent to the terminal A is displayed on a window of the monitor 126 of the terminal A in a manner similar to that mentioned above and is also transmitted to the network 16. The control command and parameters of the camera A-1 are interpreted by the system control circuit 112, thereby performing the focusing control, iris control, white balance, tripod control, and the like. Since the controllable items and the possible range of the parameters differ in dependence on each camera, the items which can be controlled by the camera, the possible range of the parameters, and the present values of the parameters are supplied from the system control circuit 112 to the terminal A in accordance with an inquiry from the terminal A. They are further supplied to the server 17 through the network 16.

Figure 5:
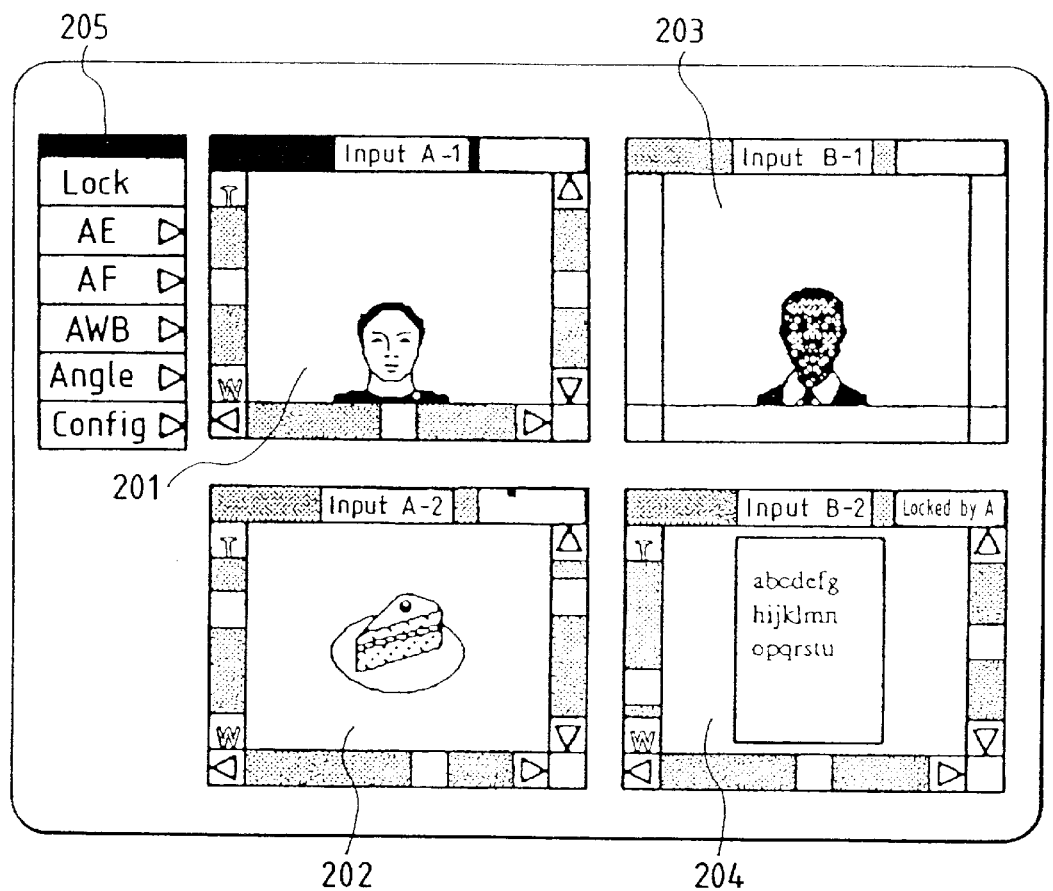
FIG. 5 is an explanatory diagram of a display screen of a terminal station A.

FIG. 5 is an explanatory diagram of a display screen of the terminal A.

In FIG. 5, reference numeral 201 denotes a display window of the camera A-1; 202 a display window of the camera A-2; 203 a display window of the camera B-1; 204 a display window of the camera B-2; and 205 a camera control menu.

Figure 6:
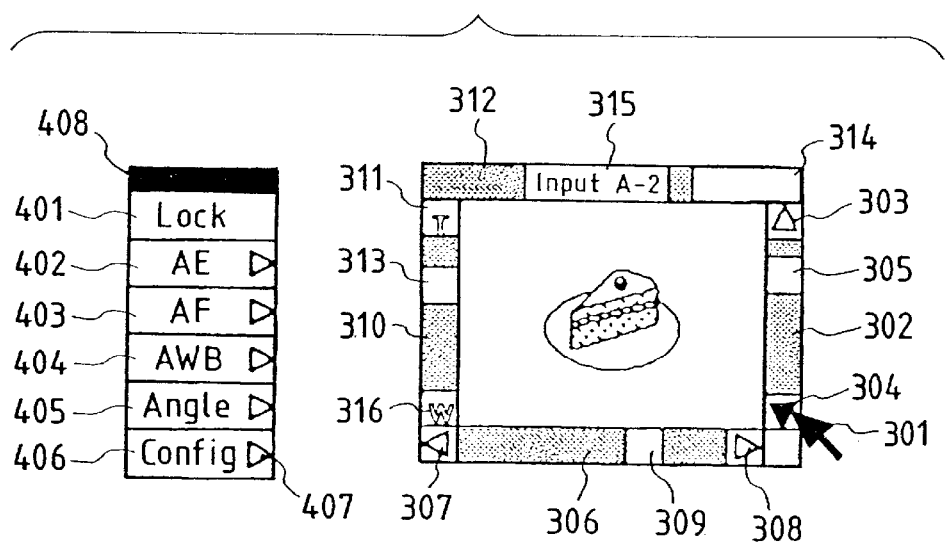
FIG. 6 is an explanatory diagram of each section of a camera control menu 205 and a display window 201.

FIG. 6 is an explanatory diagram of each section of the camera control menu 205 and display window 201.

Reference numeral 301 denotes a cursor indicative of the position designated by the pointing device; 302 a vertical panning bar as a rectangular region to display a user interface for controlling a panning in the vertical direction of the camera; 303 an upward panning button which is used when panning upward; 304 a downward panning button which is used when panning downward; and 305 a region called a thumb which is designated by pressing the button 127 of the pointing device 123. By vertically moving the cursor 301, the vertical panning operation of the camera can be executed.

The operation to move the cursor 301 with the button 127 of the pointing device 123 depressed as mentioned above is generally called "drag" and this terminology will be used hereinbelow. The operation such that the button 127 of the pointing device 123 is pressed and is soon released is generally called "click" and this terminology will be used hereinbelow.

Reference numeral 306 denotes a horizontal panning bar as a rectangular region to display a user interface to control the horizontal panning of the camera; 307 a leftward panning button which is used when panning leftward; 308 a rightward panning button which is used when panning rightward; and 309 a thumb of the horizontal panning bar 306.

Reference numeral 310 denotes a zoom bar as a rectangular region to display a user interface for controlling a field angle; 311 a telephoto button which is used when the camera is zoomed in; 316 a wide button which is used when the camera is zoomed out; and 313 a thumb of the zoom bar 310.

Reference numeral 312 indicates a rectangular region which is used for display or the like of the name of the display window and is called a title bar; 315 a name of a display window and it is assumed in the embodiment that an identification name of the camera is displayed; and 314 a status display region of the camera.

Reference numeral 408 indicates a movement bar as a rectangular region which is used when moving the camera control menu 205; 401 a Lock menu; 402 an AE menu; 403 an AF menu; 404 an AWB menu; and 405 an Angle menu. Functions of the above menus will be described hereinbelow. Reference numeral 406 denotes a configuration menu which is used to set other items and 407 indicates a hierarchy menu button which is displayed in the case where the functions which are further classified as a hierarchy exist in the lower layer. By clicking the hierarchy menu button 407, the menu of the lower layer is displayed. The hierarchy menu button 407 is displayed in all of the menus having the hierarchy menu.

Figure 7:
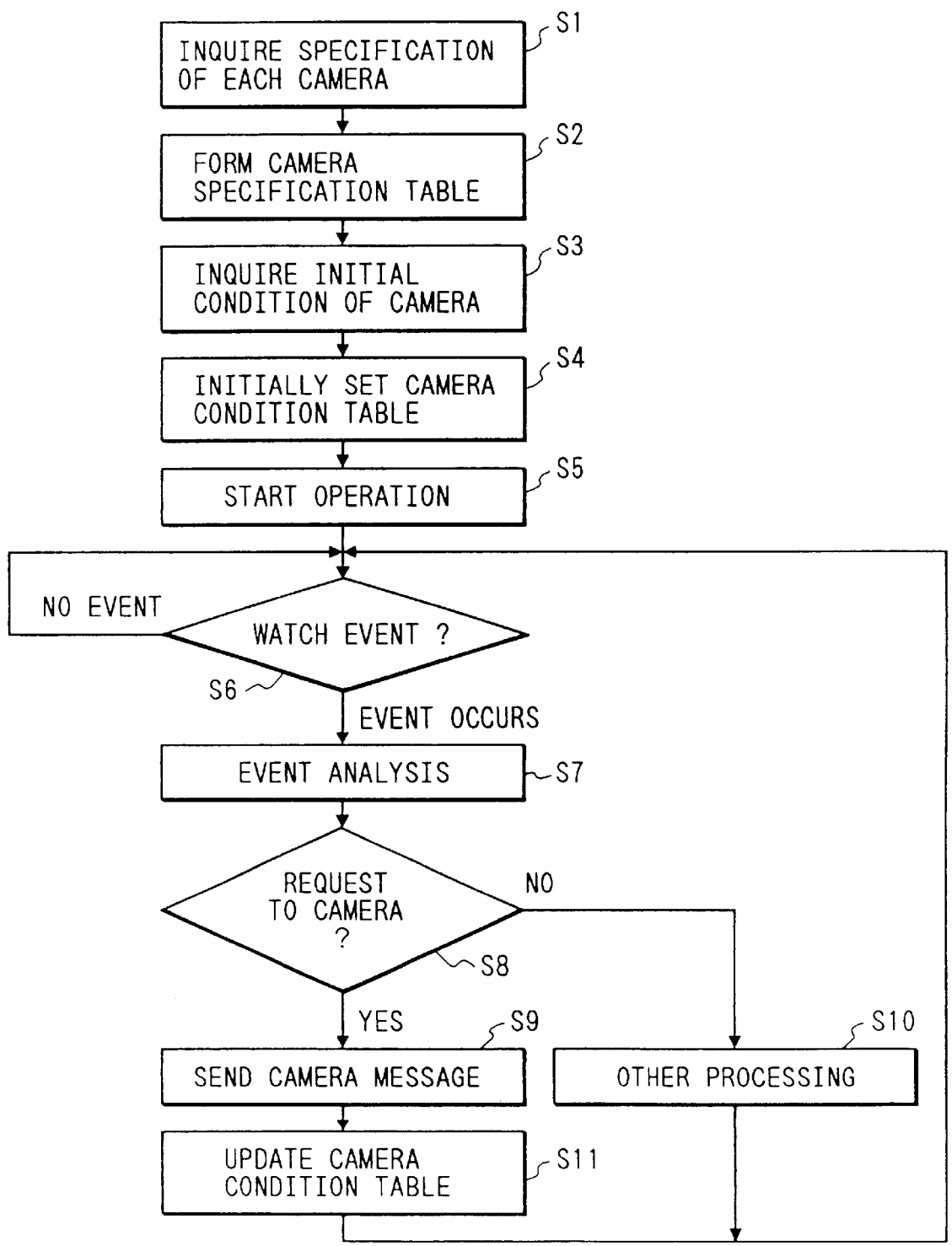
FIG. 7 is a diagram showing a part of a flow of a multimedia teleconference according to an embodiment.

FIG. 7 is a diagram showing a part of a flow of the multimedia teleconference in the embodiment.

A server to manage the conferencing system first inquires the controllable items and parameters of each camera connected to each terminal, the possible range of the parameters, and the present values thereof (step S1). Each camera receives the inquiry through the terminal and responds to the inquiry. If the camera does not have a responding ability, the terminal substitutionally responds. The server forms a table of the specification and initial status of the camera by the response information (S2 to S4). The display window 201 and camera control menu 205 are displayed on each terminal on the basis of the information of the table (S5). In this instance, a user interface for controlling according to the specification of each camera is displayed in the display window of each camera.

In the example shown in FIG. 5, as a result of the inquiry to the camera B-1, it is found out that the functions of zoom and panning cannot be used. Therefore, the vertical panning bar 302, horizontal panning bar 306, and zoom bar 310 are not displayed in the display window of the camera B-1. The aspect ratio of the camera is reflected to the shape of the display window. When the aspect ratio of the camera is equal to 4:3, the aspect ratio of the display window is equal to 4:3. When the aspect ratio of the camera is equal to 16:9, the aspect ratio of the display window is equal to 16:9. When the display window of the camera is displayed, the multimedia teleconference is started and the processing routine enters a loop to watch an event from each participant. If the participant does nothing, the watching of the event is continued (S6).

In the case where an event such as selection or the like of a menu by the participant is detected, the event is analyzed (S7). If the event indicates the item regarding the control of the camera, a control message is sent to the camera (S8, S9).

In case of the other item, the processing corresponding to it is executed (S10). In case of a message such as to change a condition of the camera, the camera analyzes the message and changes in a possible range. After that, a new condition is informed as a message to the server. The server changes a camera condition table by the message of the camera and changes the state of the display window of each terminal and the camera control menu (S11). The processing routine advances to an event loop to again perform the watching operation of the event.

The control operation and display for the camera image pickup operation will now be practically explained with reference to the description of the name of each section of the screen displays shown in FIGS. 5 and 6 and explanatory diagrams of the operations of FIG. 8A and subsequent diagrams.

FIGS. 8A to 8E are diagrams for explaining with respect to a user interface of the panning control in the embodiment. For example, FIGS. 8A to 8E show a case of performing the panning of the camera A-2.

As shown in FIG. 8A, when the title bar 312 of the display window of the camera A-2 is designated and clicked by the pointing device 123, the camera A-2 can be controlled. In this instance, the color of the title bar 312 changes as shown in FIG. 8B, thereby indicating that the camera A-2 becomes controllable.

The positions of the thumbs 305, 309, and 313 in the panning bars 302 and 306 and zoom bar 310 are determined on the basis of a specification table and a status table of the camera A-2 formed by the server 17.

FIG. 8B shows a method of controlling the vertical panning of the camera A-2. When the downward panning button 304 of the vertical panning bar 302 of the camera A-2 is designated and clicked or when the thumb 305 is designated and is dragged downward, the movable arm 5 of the camera A-2 operates, thereby panning the camera A-2 downward. In this instance, the panning operation is performed for a period of time during which the button 127 of the pointing device 123 is depressed. When the button is released, the panning operation is stopped.

On the contrary, when the upward panning button 303 of the vertical panning bar 302 is designated and is kept clicked or when the thumb 305 is designated and is dragged upward as shown in FIG. 8C, the movable arm 5 of the camera A-2 operates, thereby panning the camera A-2 upward.

When the rightward panning button 308 of the horizontal panning bar 306 is designated and clicked or when the thumb 309 is designated and dragged rightward as shown in FIG. 8D, the movable arm 5 of the camera A-2 operates, thereby panning the camera A-2 rightward. On the contrary, when the leftward panning button 307 of the horizontal panning bar 306 is designated and clicked or when the thumb 309 is designated and dragged leftward as shown in FIG. 8E, the movable arm 5 of the camera A-2 operates, thereby panning the camera A-2 leftward.

In general, there is a scroll bar to scroll a document by an application software of a word processor using the multi-window or the like. However, as shown in the embodiment, the user interface for controlling the panning is arranged at the same position as that of the scroll bar of the document, so that a desired portion of an object existing at a remote position can be seen by an operating method similar to that of the scroll of the document.

FIGS. 9A to 9E are explanatory diagrams regarding the zooming control in the embodiment.

As shown in FIG. 9A, by designating and clicking the title bar 312, the camera A-2 becomes controllable. In this instance, as shown in FIG. 9B, the color of the title bar 312 is changed, thereby indicating that the camera A-2 is in a controllable state. Subsequently, as shown in FIG. 9B, when the tele button 311 of the zoom bar 310 of the camera A-2 is designated and clicked or when the thumb 313 is designated upward and dragged, the camera A-2 is zoomed in by the lens driving unit of the camera A-2. In this instance, while the button 127 of the pointing device 123 is pressed, the zooming operation is performed. When the button is released, the zooming operation is stopped. On the contrary, as shown in FIG. 9C, when the wide button 316 of the zoom bar 310 is designated and clicked or when the thumb 313 is designated and dragged downward, the camera A-2 is zoomed out by the lens driving unit 102 of the camera A-2

FIG. 9D shows a user interface when the panning and zooming of the camera A-2 are simultaneously controlled to thereby control a field angle.

As shown in FIG. 9D, when a desired field angle range is designated by dragging the pointing device 123 from the left upper vertex of a desired field angle to the right lower vertex of the desired field angle, the designated field angle range is displayed by a broken line 601. When the Angle menu 405 of the camera control menu 205 is clicked in this state, the lens driving unit 102 and the movable arm driving unit 113 of the camera A-2 are controlled. The camera A-2 is controlled so as to obtain the designated field angle and a display is performed as shown in FIG. 9E.

FIGS. 10A to 10D are diagrams showing a user interface when an exposure level of an image of an arbitrary designated range is set to a proper value.

FIG. 10A shows a state in which although the camera A-1 photographs two persons, a state of the illumination is bad and the right half of the screen is too dark and the left half is too light, so that both of the exposure levels of two persons are not set to the proper levels. In this state, the display window of the camera A-1 is clicked by the pointing device, thereby setting the camera into the controllable state. When a screen range which should be set into a proper exposing state is designated and dragged by the pointing device as shown in FIG. 10B, a designated rectangular region 602 is displayed by a broken Line.

As shown in FIG. 10C, when the AE menu 402 is designated and clicked, both of designated range information instructing to provide a proper exposure and a message to set the exposure level in the designated range to a proper level are sent to the camera A-1 through the server 17. The system control circuit 112 of the camera A-1 controls the iris 103 through the iris driving unit 104 so as to set the image data in the designated rectangular region to a proper level. Thus, as shown in FIG. 10D, the exposure level of the camera A-1 is controlled and the designated range is set to the proper exposure level. The designated range information of the optimum exposure level in the camera condition table of the server 17 is changed as set in the camera A-1.

FIGS. 11A to 11D are diagrams showing a user interface when the camera is focused on an object in an arbitrary designated range in the embodiment.

FIG. 11A shows a display screen in the case where two persons were photographed by the camera A-1. However, since the focusing information is generally obtained by the image data near the center of the screen, if an object like a calendar exists at the center of the screen as shown in the diagram, the camera is focused on the calendar and is not focused on the persons. In such a case, by designating and clicking the title bar 312 of the display window of the camera A-1, the camera A-1 becomes controllable.

Subsequently, as shown in FIG. 11B, when the screen range to be focused is designated and dragged by the pointing device, a designated rectangular region 603 is displayed by a broken line.

As shown in FIG. 11C, when an AF menu is clicked, both of focusing range designation information and a message instructing to focus on the designated focusing range are sent to the camera A-1 through the server 17. The system control circuit 112 of the camera A-1 performs a focusing adjustment of the lens 101 through the lens driving unit 102 so as to maximize a sharpness degree of the image in the designated focusing range on the basis of the focusing range designation information, thereby focusing on the designated persons as shown in FIG. 11D. The designated range information of the focusing range in the camera condition table of the server 17 is also changed as set in the camera A-1.

FIGS. 12A to 12D are diagrams showing a user interface when a white balance is attained on the basis of the image information in an arbitrary designated range in the embodiment.

FIG. 12A shows a state in which since the color of the wall is extremely deep, a white balance cannot be attained according to the average color information of the screen. In such a case, the title bar of the display window of the camera A-1 is designated and clicked by the pointing device, thereby making the camera A-1 controllable. Subsequently, as shown in FIG. 12B, when a rectangular region which is expected to be white is dragged and designated, a rectangular region 604 is displayed by a broken line. As shown in FIG. 12C, when the AWB menu 405 is designated and clicked, both of the coordinate information of the rectangular region 604 and a message instructing to attain a white balance on the basis of the image information in the rectangular region are sent to the camera A-1 through the server 17. The system control circuit 112 of the camera A-1 controls so as to attain a white balance by the white balance processing 502 from the image information corresponding to the rectangular region 604. By the above operation, the white balance of the camera A-1 is attained by the image information of the designated range. The designated range information of the white balance in the camera condition table of the server 17 is also changed as set in the camera A-1.

FIGS. 13A to 13D are diagrams showing a memory function of the field angle setting and its user interface in the embodiment.

It is now assumed that the camera A-2 has been set to a field angle as shown in FIG. 13A. In the case where it is presumed that a frequency of the use of such a field angle is large, by clicking the hierarchy menu button 407 of the Angle menu 405, a Memorize menu 409 is displayed. As shown in FIG. 13B, the cursor 301 of the pointing device 123 is dragged onto the Memorize menu 409 and the button 127 of the pointing device 123 is subsequently released, the field angle set information is stored. At the same time, a reduction image 410 of the image at the field angle appears at a position adjacent to the Memorize menu 409. Each time the above operation is repeated, a new reduction image is registered at a position adjacent to the Memorize menu 409.

A method of again setting to the stored field angle will now be described. As shown in FIG. 13C, the cursor 301 of the pointing device 123 is dragged to the position of the registered reduction image indicative of the field angle to be set and the button 127 of the pointing device 123 is subsequently released. Thus, the lens driving unit 102 and movable arm driving unit 113 of the camera A-2 are controlled as shown in FIG. 13D and the camera A-2 is controlled so as to have the designated field angle.

Although the description is omitted, the above method can be used to store not only the setting of the field angle but also the setting of the range to set the exposure level to the optimum exposure level described in the AE menu, the setting of the focusing designated range described in the AF menu, and the setting of the range of the white balance described in the AWB menu.

FIG. 14 shows a display example in case of applying the memory function of the setting and the reduction image to the hierarchical menu of the AE menu. Since the field angle is not changed in case of the AE menu or the like, in order to allow the setting to be easily selected again, the region indicative of the set range in the reduction image is displayed in a broken line rectangular region 605.

FIGS. 15A to 15C are diagrams for explaining a user interface when the setting of the camera A-2 is fixed for a predetermined time.

Changes of the set field angle and other settings from another terminal can be inhibited for a predetermined time. As shown in FIG. 15A, when the title bar 312 of the display window of the camera A-2 is designated and clicked by the pointing device at the terminal B, the camera A-2 becomes controllable. As shown in FIG. 15B, subsequently, when the Lock menu 401 is clicked, the camera is fixed to the present set condition of the camera. That is, the control of the camera A-2 from another terminal is inhibited. In this instance, there is a time limitation in the set fixed time and the remaining time is displayed on a residual time display window 606. A message indicating that the terminal is in use is displayed in the status display region 314 of the window of the camera A-2 at the terminals other than the terminal B as shown in FIG. 15C.

Figure 16:
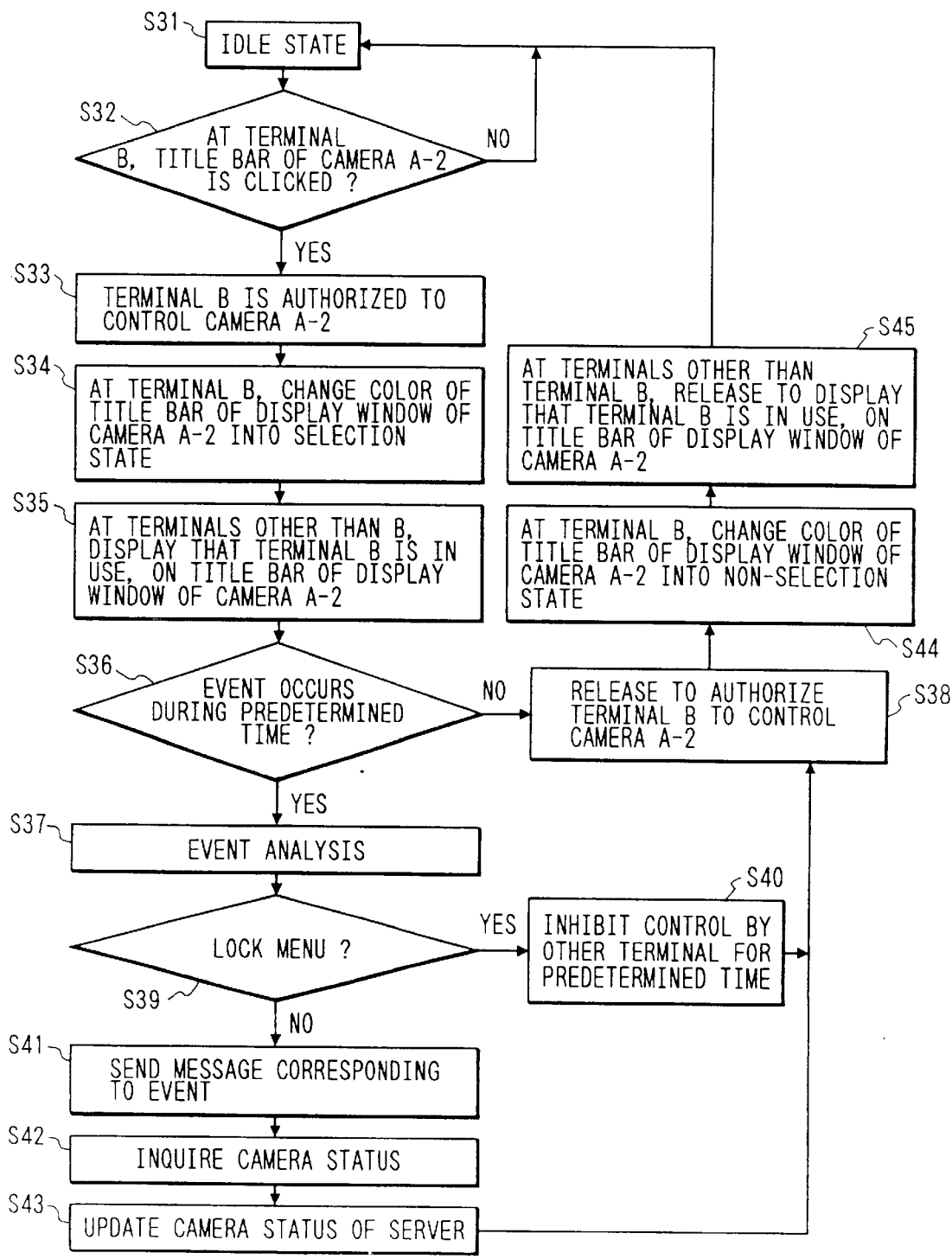
FIG. 16 is a diagram showing a control flow to authorize to control a camera.

FIG. 16 shows a control flow of a control authorization of the camera.

When the title bar 312 of the display window of the camera A-2 is designated and clicked at the terminal B, the terminal B is authorized to control the camera A-2 (S31 to S33). Subsequently, the color of the title bar 312 of the display window of the camera A-2 of the terminal B is changed to a selection state (S34). A message indicating that the terminal B is in use is displayed in the camera status display region 314 of the title bar of the display window of the camera A-2 other than the terminal B (S35). When an event occurs within a predetermined time, the event is analyzed (S36, S37). When no event occurs within the predetermined time, it is released to authorize the terminal B to control the camera A-2 (S36, S38). When it is judged by the event analysis that the Lock menu 401 has been selected, the control of the camera A-2 from another terminal is inhibited for a predetermined time and a residual time to fix the setting of the camera A-2 is displayed in the residual time display window 606 at the terminal B (S37, S39, S40). After the elapse of a predetermined time, it is released to authorize the terminal B to control the camera A-2 (S38). When the event analysis does not indicate the selection of the Lock menu 401, a message corresponding to the event such as a change of the field angle or the like is sent to the camera A-2 (S39, S41). When the status is changed, the camera sends a condition table updating request message of the camera to the server 17 (S42). The server 17 updates the camera condition table in accordance with the request (S43). When the authorization to control is released, the color of the title bar 312 of the display window of the camera A-2 of the terminal B is changed to the non-selection state (S44). The display of the camera status display region 314 of the title bar 312 of the display window of the camera A-2 other than the terminal B is released (S45).

As described above, according to the invention, various settings of the camera at a remote position can be easily controlled by the user interface for control such as menu, button, or the like associated with the display window of the image of the camera.

Particularly, in the panning control of the camera, a desired portion of the object which is photographed by the camera existing at a remote position can be seen by a method similar to that of the scroll of a document in a word processor or the like. Since the controllable attribute or variable range of the camera are automatically reflected to the display of the user interface for control such as menu or the like, the user can easily operate without needing to consider the attribute or the like of the camera at the time of the operation. In the camera at a remote position, the works for adjusting the field angle to an arbitrary portion of the object, for adjusting the focal point, for optimizing the exposure level, and for attaining the white balance can be executed by the unified user interface.

The reduction screen image corresponding to those set conditions can be automatically registered and the registered reduction image functions as a menu when resetting to desired set conditions, so that the operation to select the resetting becomes very easy. By setting such that the set conditions which were set into a desired state cannot be changed for a predetermined time from another terminal, the desired set state can be held for a predetermined time. Both the name of the terminal authorized to control the camera and the message indicating that such a terminal is in use are displayed in the status display region in the display window of the camera at each terminal, so that the operator of another terminal can judge whether the camera is controllable or not and can also easily judge to which terminal the authorization to control should be requested.

What is claimed is:

1. Image pickup control apparatus for controlling a plurality of cameras through a communications means, a plurality of image pickup control apparatuses being coupled to the communications means, each camera being controllable by each of the plurality of image pickup control apparatuses coupled to the communications means, said image pickup control apparatus comprising:

image display means for inputting image signals picked-up by the plurality of cameras, and for displaying the images as multi-windows;

designation means for designating a desired image from the multi-windows; and control means for controlling, through the communication means, at least one of a focal distance and an image pickup direction of a camera which picked-up the image designated by said designation means, and for preventing the other image pickup control apparatuses of said plurality of image pickup control apparatuses from controlling the camera corresponding to the image designated by said designation means through said communication means.

2. Apparatus according to claim 1, further comprising storage means for storing images picked-up by one of the plurality of cameras.

3. Apparatus according to claim 2, wherein said control means controls said camera which picked-up the image designated by said designation means so as to pickup the designated image in an imaging condition in which the images stored in said storage means were picked-up.

4. An image pickup control apparatus for controlling a plurality of cameras through a communications means, a plurality of image pickup control apparatuses being coupled to the communications means, each camera being controllable by each of the plurality of image pickup control apparatuses coupled to the communications means, said image pickup control apparatus comprising:

image display means for inputting image signals picked-up by the plurality of cameras, and for displaying the images as multi-windows;

designation means for designating a desired image from the multi-windows; and control means for executing automatic focusing control of a camera which picked-up the image designated by said designation means, and for inhibiting the other image pickup control apparatuses of said plurality of image pickup control apparatuses from controlling, through the communication means, the automatic focusing of the camera corresponding to the image designated by said designation means.

5. Apparatus according to claim 3, further comprising storage means for storing the images picked up by one of the plurality of cameras.

6. Apparatus according to claim 5, wherein said control means controls the camera which picked-up the image designated by said designation means in an imaging condition in which the image is stored by said storage means were picked-up.

7. A video system comprising:

a camera; and a plurality of control devices each of which is capable of controlling said camera, each of said plurality of control devices including display means having a screen for displaying an image picked-up by said camera; and controlling means for controlling said camera through one of said plurality of control devices via a network, and for preventing control devices of said plurality of control devices, other than said one of said plurality of control devices which is controlling the camera via the network, from controlling said camera.

8. A system according to claim 7, further comprising a plurality of cameras, and wherein each control device is capable of controlling each of the plurality of cameras.

9. A system according to claim 7, further comprising designation means for designating an image displayed on said screen.

10. A system according to claim 7, wherein when one of said plurality of control devices controls said camera, the others of said plurality of control devices are inhibited from controlling said camera for a predetermined period of time.

11. A system according to claim 10, wherein, after said predetermined period of time has lapsed, said others of said plurality of control devices are released from being inhibited from controlling said camera.

12. A system according to claim 10, wherein said display means displays said predetermined time period.

13. A system according to claim 7, wherein said display means displays an indication that said camera is controlled by a predetermined control device.

14. A control apparatus for control of a camera through a communication means, the camera being controllable from each of a plurality of control apparatuses coupled to the communication means, said control apparatus comprising:

the communication means for communicating with the camera;

display means coupled to said communication means and having a screen for displaying an image picked-up by said camera; and control means coupled to said communication means, for controlling the camera through said communication means, and for inhibiting others of said plurality of control apparatuses from controlling the camera when one of said control apparatuses controls the camera through said communication means.

15. Apparatus according to claim 14, wherein said control means controls each of a plurality of cameras through said communication means.

16. Apparatus according to claim 14, further comprising designation means for designating a desired image on the screen of said display means.

17. Apparatus according to claim 14, wherein said control means inhibits another control apparatus from controlling the camera for a predetermined period of time.

18. Apparatus according to claim 17, wherein said control means releases the another control apparatus from being inhibited from controlling the camera after the predetermined period of time has lapsed.

19. Apparatus according to claim 17, wherein said display means displays the predetermined time period.

20. Apparatus according to claim 14, wherein said display means displays that said control apparatus controls the camera.

21. A method of controlling a camera coupled to a communication system having a plurality of control apparatuses and at least one display screen, wherein the camera is controllable by each of said plurality of control apparatuses, said method comprising the steps of:

a step of displaying, on the screen, an image picked-up by the camera;

a step of controlling the camera through the communication system with one of the plurality of control apparatuses; and a step of inhibiting the others of said plurality of control apparatuses from controlling the camera through the communication system when the camera is controlled by said one of the plurality of control apparatuses through the communication system.

22. A method according to claim 21, wherein a plurality of cameras are coupled to the communication system, and wherein said step of controlling comprises the step of controlling the plurality of cameras, through said communications system, by the one of the plurality of control apparatuses.

23. A method according to claim 21, wherein said step of displaying includes the step of displaying a plurality of images on the screen, and further comprising the step of designating one of the images displayed on the screen.

24. A method according to claim 21, wherein said inhibiting step comprises the step of inhibiting said others of said plurality of control apparatuses from controlling said camera for a predetermined period of time.

25. A method according to claim 24, further comprising the step of releasing said others of said plurality of control apparatuses from being inhibited from controlling said camera after said predetermined period of time has lapsed.

26. A method according to claim 24, further comprising the step of displaying said predetermined period of time.

27. A method according to claim 21, further comprising the step of displaying an indication that the camera is controlled by said one of the plurality of control apparatuses.

* * * * *

UNITED STATES PATENT AND TRADEMARK OFFICE
CERTIFICATE OF CORRECTION

PATENT NO.     : 6,313,875 B1
DATED          : November 6, 2001
INVENTOR(S)    : Akira Suga et al.

It is certified that error appears in the above-identified patent and that said Letters Patent is hereby corrected as shown below:

<u>Title page,</u>
Item [56], References Cited, U.S. PATENT DOCUMENTS, insert:
-- 4,622,596   11/1986   Suga et al.
   4,901,154   02/1990   Suga et al.
   5,296,925   03/1994   Kondo et al.
   5,305,096   04/1994   Yamagami et al.
   5,303,050   04/1994   Nishimura et al.
   5,128,770   07/1992   Inana et al.
   5,402,170   03/1995   Parulski et al.
   5,450,129   09/1995   Matoba et al. --.

FOREIGN PATENT DOCUMENTS, insert:
-- 04-42673   02/1992   Japan
   2-302181   12/1990   Japan
   3-207171   09/1991   Japan
   2-252473   08/1992   Great Britain --.

Item [57], ABSTRACT,
Line 2, "up" should read -- up by --.

<u>Column 13,</u>
Line 20, "claim 3," should read -- claim 4, --.

Signed and Sealed this

Thirteenth Day of August, 2002

*Attest:*

JAMES E. ROGAN
*Attesting Officer*   *Director of the United States Patent and Trademark Office*